(12) United States Patent
Valentian

(10) Patent No.: US 8,893,514 B2
(45) Date of Patent: Nov. 25, 2014

(54) CRYOGENIC LIQUID STORAGE SYSTEM FOR A SPACECRAFT

(75) Inventor: Dominique Valentian, Rosny sur Seine (FR)

(73) Assignee: SNECMA, Paris (FR)

( * ) Notice: Subject to any disclaimer, the term of this patent is extended or adjusted under 35 U.S.C. 154(b) by 940 days.

(21) Appl. No.: 12/489,733

(22) Filed: Jun. 23, 2009

(65) Prior Publication Data

US 2010/0000232 A1     Jan. 7, 2010

(30) Foreign Application Priority Data

Jul. 4, 2008   (FR) ...................................... 08 54569

(51) Int. Cl.
*F17C 5/02* (2006.01)
*F17C 7/02* (2006.01)
*F17C 9/02* (2006.01)
*F17C 13/08* (2006.01)
*B64G 1/40* (2006.01)
*B64G 1/12* (2006.01)

(52) U.S. Cl.
CPC .............. *F17C 13/088* (2013.01); *B64G 1/402* (2013.01); *B64G 1/12* (2013.01); *B64G 1/401* (2013.01); *B64G 1/405* (2013.01); *F17C 2205/013* (2013.01); *F17C 2205/0161* (2013.01); *F17C 2270/0194* (2013.01); *F17C 2205/0192* (2013.01); *F17C 2203/0663* (2013.01); *F17C 2205/0323* (2013.01); *F17C 2205/0338* (2013.01); *F17C 2205/0391* (2013.01); *F17C 2221/011* (2013.01); *F17C 2221/016* (2013.01); *F17C 2223/0115* (2013.01); *F17C 2223/0161* (2013.01); *F17C 2223/033* (2013.01); *F17C 2223/035* (2013.01); *F17C 2225/0115* (2013.01); *F17C 2225/0161* (2013.01); *F17C 2227/0135* (2013.01); *F17C 2227/0353* (2013.01); *F17C 2227/036* (2013.01); *F17C 2227/0372* (2013.01); *F17C 2227/0374* (2013.01); *F17C 2250/043* (2013.01); *F17C 2250/0491* (2013.01); *F17C 2250/0636* (2013.01); *F17C 2260/027* (2013.01)
USPC ............................... 62/47.1; 62/50.2; 62/50.3

(58) Field of Classification Search
USPC ......... 62/6, 46.3, 47.1, 48.1, 48.4, 49.1, 49.2, 62/50.2, 50.3
See application file for complete search history.

(56) References Cited

U.S. PATENT DOCUMENTS 3,304,729 A *   2/1967   Chandler et al. ............... 62/48.3
3,347,056 A     10/1967   Lester (Continued)

FOREIGN PATENT DOCUMENTS

EP          0042784      12/1981
EP          0625672      11/1994

(Continued)

*Primary Examiner* — Judy Swann
*Assistant Examiner* — Ignacio E Landeros
(74) *Attorney, Agent, or Firm* — Preti Flaherty Beliveau & Pachios LLP

(57) ABSTRACT

A cryogenic liquid storage system for a spacecraft comprising at least one liquid tank with an outer casing and an evacuated space arranged between the tank and the outer casing. The system further comprises a propellant management device made of material that is a good conductor of heat and that is cooled by a cryorefrigerator to localize the liquid inside the tank when in microgravity, a filler pipe situated in the portion of the tank that is at the bottom when the tank is on the ground, and that is surrounded by an evacuated insulating double wall and a purge pipe connecting the tank to the outer casing and presenting an internal length that is not less than half the diameter of the tank.

15 Claims, 5 Drawing Sheets

(56) References Cited

U.S. PATENT DOCUMENTS

| | | | |
|---|---|---|---|
| 3,961,726 A | 6/1976 | Fournet | |
| 4,272,257 A | 6/1981 | Ellion et al. | |
| 4,386,309 A | 5/1983 | Peschka | |
| 4,530,213 A * | 7/1985 | Kadi | 62/55.5 |
| 4,733,531 A * | 3/1988 | Grove | 60/259 |
| 4,821,907 A | 4/1989 | Castles et al. | |
| 4,957,157 A * | 9/1990 | Dowdy et al. | 165/104.27 |
| 5,263,329 A | 11/1993 | Grove et al. | |
| 5,613,366 A * | 3/1997 | Schoenman | 62/45.1 |
| 5,901,557 A | 5/1999 | Grayson | |
| 6,336,318 B1 | 1/2002 | Falce et al. | |
| 2007/0107445 A1 * | 5/2007 | Boesel et al. | 62/51.1 |

FOREIGN PATENT DOCUMENTS

| | | |
|---|---|---|
| JP | 1-244999 | 9/1989 |
| JP | 2001-280591 | 10/2001 |
| JP | 2006-329359 | 12/2006 |
| SU | 1529001 | 12/1989 |
| SU | 1539444 | 1/1990 |
| WO | WO 2007/004248 | 1/2007 |
| WO | WO 2007/031064 | 3/2007 |

\* cited by examiner

CRYOGENIC LIQUID STORAGE SYSTEM FOR A SPACECRAFT

FIELD OF THE INVENTION

The present invention relates to a cryogenic liquid storage system for a spacecraft, the system comprising at least one liquid tank.

PRIOR ART

Space tanks are already known for storing superfluid liquid helium for the purpose of cooling detectors and telescopes in infrared astronomy satellites.

Nevertheless, the weight of the insulation required for a tank of that type is very great and makes it difficult for use in a propulsion application.

Furthermore, the use of liquid hydrogen and oxygen for missions in earth orbit or for interplanetary missions has been analyzed for many years, in particular in the United States of America. It is necessary to establish a liquid/vapor phase boundary under microgravity making use of the same principles as surface tension tanks for satellites. Thermal insulation is simpler and lighter in weight than it is with liquid helium tanks.

Document EP 1 248 031 A2 describes an example of a tank of that type for storing liquid hydrogen or liquid oxygen under acceleration or in a ballistic stage for short-duration missions in launchers. Nevertheless, no provision is made for use in interplanetary missions of long duration.

Telecommunications satellites are also known that are fitted with plasma or ion thrusters that are fed with xenon that is stored in the supercritical state in high-pressure tanks, generally comprising a titanium shell with an outer winding of carbon fibers.

The chances of reducing the overall size, and thus of increasing the density of the supercritical fluid (specific gravity 1.4 to 1.7), leads to a high maximum pressure in operation (15 megapascals (MPa) to 19 MPa), and consequently to tanks that are quite heavy with weight that corresponds to 10% to 13% of the weight of stored xenon.

Present-day systems of that type serve solely for controlling the north-south axis of geostationary satellites. If a portion of the orbit transfer were also to be performed under electric drive, the weight might be doubled. For such an application, it would therefore be desirable to be able to reduce the dry weight and the volume of tanks.

NASA has also prepared an interplanetary mission using electric propulsion: the Dawn mission is a mission to the asteroid belt and it relies on using ion thrusters that are fed with xenon. The dry weight of the Dawn propulsion system is 129 kilograms (kg). The tank weighs 21.6 kg and contains 425 kg of xenon. This relatively small percentage (5.1%) is obtained at the cost of technology that is very difficult. The limit temperature is 30° C. as compared with 50° C. for telecommunications satellites, and the maximum threshold is 8.4 MPa. The diameter of the tank (90 centimeters (cm)) determines the diameter of the central tube of the Dawn probe. The expander system weighs 18.5 kg (plates, buffer tanks, and high-pressure components), not including the controlling electronics (2.5 kg).

It can thus be seen that the function of storing and delivering xenon represents 33% of the dry weight as a whole, and that is not negligible for an interplanetary mission where performance is greatly improved if the dry weight of the subsystem is reduced.

In general, systems fitted with plasma or ion thrusters fed with xenon stored in the supercritical state in high-pressure tanks present the following drawbacks:

the dry weight percentage of the storage is higher than it is with chemical propulsion;

it is necessary to interpose high-pressure valves and an expander between the tank and the thrusters, thereby increasing weight and reducing reliability because of the increased number of components; and the safety factor of the tank is generally too low to allow personnel to be present without restriction after the tank has been filled.

FIG. 10 is a diagram showing a prior art embodiment with a propulsion system having four plasma or ion thrusters 110 using hollow cathodes, each fitted with a xenon flow rate control module 109 comprising a set of valves and regulator members. The xenon (or where appropriate supercritical krypton) is stored in a xenon tank 101 under high pressure. A filling/emptying valve 102 enables the tank 101 to be filled or emptied via a filling/emptying orifice 103.

A high-pressure sensor 104 is associated with the tank 101. Two redundant branches connect the tank 101 to the xenon flow rate control modules 109. Each branch comprises two high-pressure pyrotechnic valves 105 in series, an electronic expander 106, a low-pressure pyrotechnic valve 107, and a bistable valve 108.

DEFINITION AND OBJECT OF THE INVENTION

The present invention seeks to remedy the drawbacks of the above-mentioned prior art systems.

The invention seeks in particular to reduce the structural index of the tanks and the associated fluid systems and to improve the safety factor under pressure in such a manner as to enable personnel to be present without restriction after a tank has been filled.

In accordance with the invention, these objects are achieved by a cryogenic liquid storage system for a spacecraft, the system comprising at least one liquid tank, and including an outer casing, an evacuated space provided between the tank and the outer casing, a propellant management device made of material that is a good conductor of heat and that is cooled by a cryorefrigerator to localize the liquid inside the tank when in microgravity, and a filler pipe situated in the portion of the tank that is at the bottom when the tank is on the ground, and that is surrounded by an evacuated insulating double wall and a purge pipe connecting the tank to the outer casing and presenting an internal length that is not less than half the diameter of the tank.

The system includes means for holding the tank inside the outer casing, these holder means presenting low thermal conductivity and being spaced apart angularly by 30° to 120° relative to the propellant management device that is cooled by the cryorefrigerator.

In a first possible embodiment, the propellant management device is disposed on a polar axis of the tank and said holder means comprise a fastener skirt of insulating material interposed in the vicinity of an equatorial plane between the tank and the outer casing.

In another possible embodiment, the propellant management device in the form of two truncated cones secured to a ring that is cooled by the cryorefrigerator, is disposed in the vicinity of the equatorial plane, and said holder means comprise mechanical fastener members interposed on a polar axis between the tank and the outer casing.

Advantageously, the system includes super-insulating material interposed between the tank and the outer casing.

Preferably, the liquid tank and the outer casing are mounted in a central tube in the vicinity of the center of gravity of the spacecraft.

According to a particular characteristic, the system includes a decoupling bellows interposed between the cryorefrigerator and the outer casing.

In a particular embodiment, the system includes an evaporator immersed in the liquid of the tank at the location closest to the cryorefrigerator, which evaporator comprises a porous material and is extended by a tube of small section that is connected to the outer casing.

In another particular embodiment, the system includes a pipe connecting the tank to the outer casing, an inner screen forming a liquid evaporator being incorporated in said pipe.

A heater element may be associated with the evaporator.

In a particular embodiment, the system includes a cryorefrigerator having a cold head incorporated in the tank in the vicinity of a liquid takeoff opening, the cryorefrigerator being connected to a radiator by a cooling loop.

In another particular embodiment, the system includes a cryorefrigerator mounted directly on a radiator and connected to the tank by a cryogenic heat pipe.

The cryorefrigerator may be of the Stirling type or of the pulsed gas tube type.

In another possible embodiment, the system includes a cryorefrigerator of the Joule Thomson type with an expansion stage located in the tank and a compressor offset to a cooling radiator.

In a first possible application of the system of the invention, the cryogenic liquid stored in the tank is a liquefied inert gas comprising xenon, krypton, neon, or argon for feeding gridded plasma or ion electric thrusters.

In another possible application of the system of the invention, the cryogenic liquid stored in the tank is liquid oxygen.

The spacecraft to which the cryogenic liquid storage system of the invention is applied may be constituted in particular by a satellite, an automatic probe, or an inhabited spacecraft.

Storing a component such as xenon in the liquid state in a spacecraft tank presents several advantages:
- density is higher (3057 kilograms per cubic meter ($kg/m^3$) instead of $1200 kg/m^3$ to $1600 kg/m^3$), thereby implying a tank of smaller volume;
- storage pressure can be controlled so as to correspond to the feed pressure of the thrusters, thereby avoiding the use of high-pressure expanders;
- there is no rapid fluctuation in the feed pressure;
- the weight of the tank (low-pressure tank) is smaller than that required for supercritical storage; and
- the tank can be filled quickly, whereas one or more days are required for filling a supercritical tank. Both xenon gas and the wall made of composite material present low thermal conductivity, such that filling a supercritical tank too quickly leads to the xenon being heated excessively by quasi-adiabatic compression.

BRIEF DESCRIPTION OF THE DRAWINGS

Other characteristics and advantages of the invention appear from the following description of particular embodiments given by way as examples, with reference to the accompanying drawings, in which.

DETAILED DESCRIPTION OF PREFERRED EMBODIMENTS

The invention relates to tanks for storing an inert gas such as xenon, krypton, neon, or argon in the liquid state for feeding to electric (plasma or ion) thrusters for satellites or planetary probes.

The invention also applies to storing cryogenic fuel components such as liquid oxygen in spacecrafts.

Figure 1:
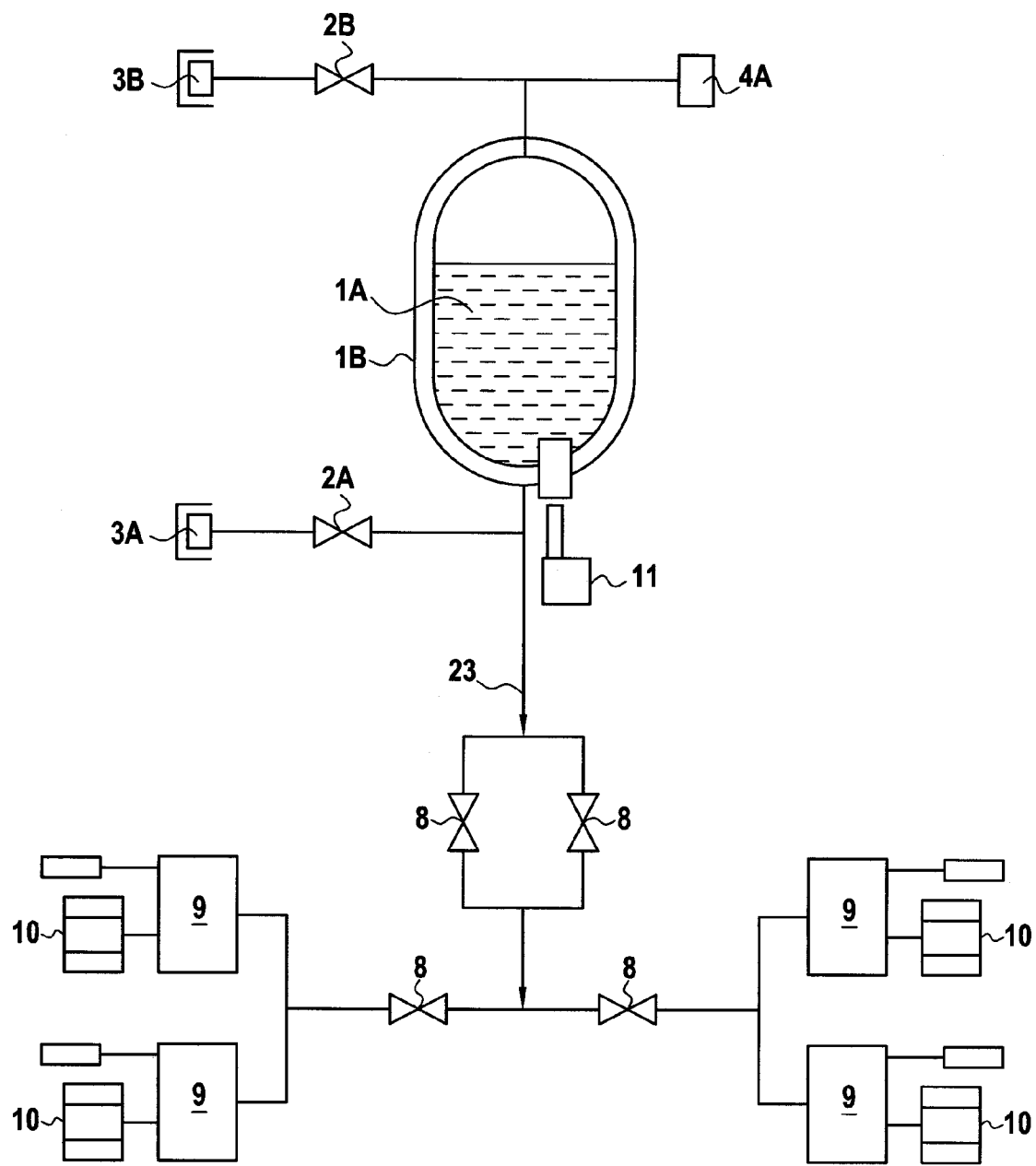
FIG. 1 is a diagrammatic overall view of a liquid storage system of the invention suitable for a spacecraft.

FIG. 1 shows an example of the invention applied to an electric propulsion system.

A tank 1A for storing cryogenic liquid is contained within an outer casing 1B in which a vacuum is established.

A cryorefrigerator 11 cools the liquid contained in the tank 1A, which liquid may be xenon, krypton, neon, or argon, for example.

Reference 2A designates a valve for filling/emptying the tank 1A with liquid via a liquid filling/emptying orifice 3A.

A valve 2B enables the vapor in the tank 1A to be bled off to a vapor-purge orifice 3B.

A low pressure sensor 4A serves to monitor the vapor pressure inside the tank 1A.

By means of a line 23, the tank 1A serves to feed inert gas to plasma or ion thrusters 10 disposed outside the tank 1A and its outer casing 1B.

Each plasma or ion thruster with a hollow cathode is associated with a module 9 for controlling the flow rate of the inert gas (such as xenon). Each control module 9 comprises a set of valves and regulator members.

The feed line 23 is connected to the control modules 9 via a simple set of bistable valves 8, two bistable valves 8 connected in parallel in redundant manner and connected in series with two bistable valves 8, a first of which is connected to a first group of two control modules 9, and a second of which is connected to a second group of two control modules 9.

Figure 10:
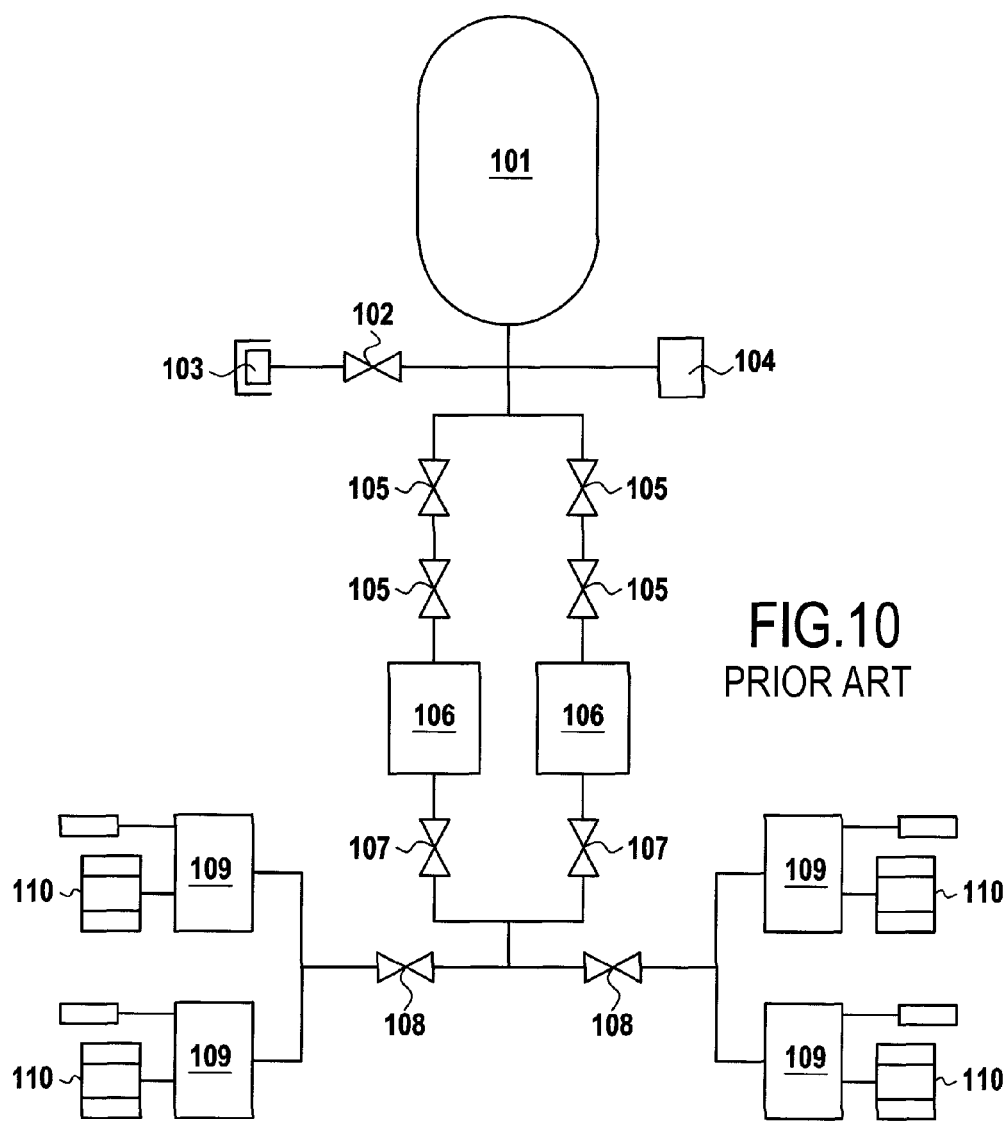
FIG. 10 is a diagrammatic overall view of an example of a liquid storage system suitable for a spacecraft, in a particular embodiment of the prior art.

A system of the invention presents the following advantages in particular:

the density of the liquid in storage is higher than when using a supercritical storage technique;

the weight of the tank and expander assembly is smaller than when using a supercritical storage technique (since the high-pressure pyrotechnic valves 105 and the expander 106 of the prior art system of FIG. 10 are eliminated given that the liquid is stored at low pressure);

there is no high pressure, so there is no restriction of access for operators preparing a launch;

the tank may be modified easily by adding a cylindrical section so as to provide a volume that matches requirements. The lack of high pressure makes such modification very easy. The diameter selected for the tank enables it to be matched simply to the dimensional requirements of platforms;

there are no pressure peaks in the feed to the thrusters, as can happen with certain expanders;

the feed pressure to the thrusters 10 can be adjusted by controlling temperature. This enables operation to continue in degraded mode in the event of the control and flow rate regulator unit 9 breaking down; and the small size of the thermal bridges makes it possible to stop active cooling for several days, e.g. as a result of losing control of the satellite and its electrical power supply being interrupted, or while waiting on the ground prior to launch.

Figure 2:
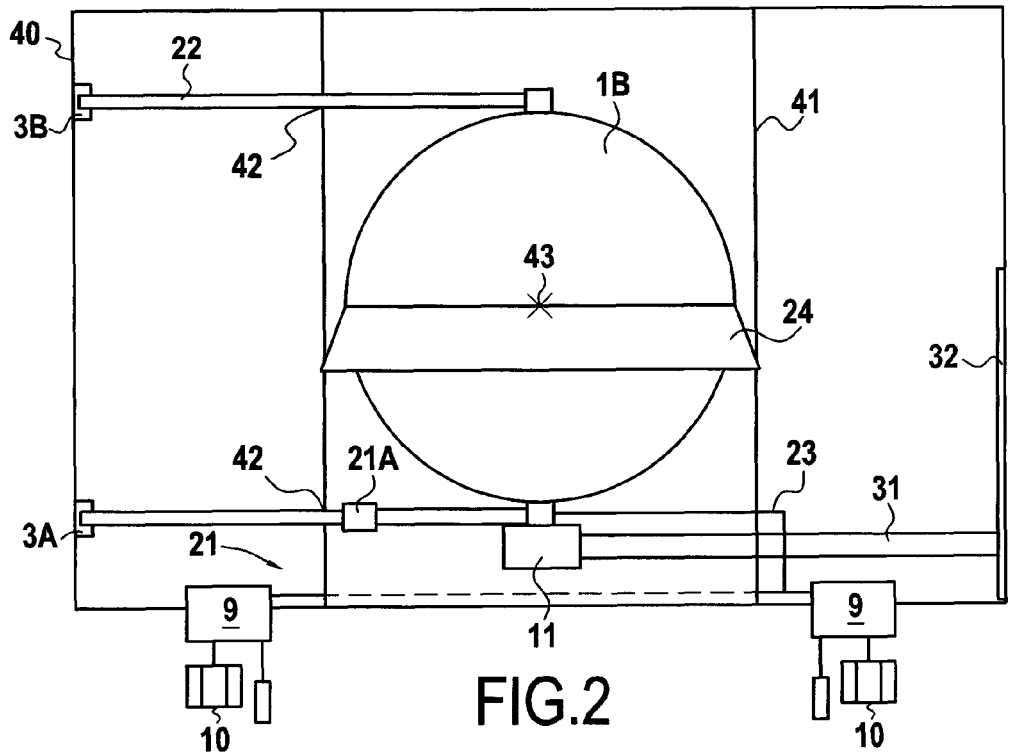
FIG. 2 is a diagrammatic elevation view showing a first example of a mounting for a liquid storage system of the invention on a spacecraft platform.

FIG. 2 shows an example of how a tank and its outer casing 1B of the invention can be integrated in a satellite or a probe.

FIG. 2 shows an outer casing 1B situated at the center of a platform 40 so that its geometrical center is close to the center of gravity 43 of the platform 40.

The outer casing 1B and the inner tank (not shown in FIG. 2) are mounted in a central tube 41 such that their geometrical center lies close to the center of gravity of the spacecraft that comprises the platform 40 together with the plasma or ion electric thrusters 10 and their associated control modules 9.

The central tube 41 has openings 42 for passing an evacuated double-walled line 21 for filing cryogenic liquid, a line 22 for removing vapor, and a line 23 for feeding the electric (plasma or ion) thrusters 10, which are external to the casing 1B.

The evacuated line 21 may include a connector 21A that enables the evacuated section of the line between the connection 21A and the filing coupling 3A to be mounted after the tank and its outer casing 1B have been fastened inside the central tube 41. The connection 21A may be a flange with a hermetic metal sealing gasket or a connection welded with the help of an orbital welding clamp.

The tank and its outer casing 1B are held in the structure of the central tube 41 by fastener means, e.g. in the form of a conical skirt.

Since the tank is placed in an environment that is at a temperature lying in the range 10° C. to 40° C. during a mission, it is essential to cool the evacuated tank. This is done with the help of a cryorefrigerator 11 which may, for example, be of the Stirling type or of the pulsed gas tube type.

FIG. 2 shows a cryorefrigerator having its cold head incorporated in the tank. Such a cryorefrigerator constitutes a single block, i.e. the cold head and the feed compressor form a single part. In this example, the compressor of the cryorefrigerator is cooled by a heat-conveying link 31 that is itself connected to a radiator 32 that radiates the power that needs to be dissipated into space (whereas on the ground natural convection acts together with radiation for cooling purposes). The heat drain 31 may be a heat pipe or a fluid loop.

Figure 3:
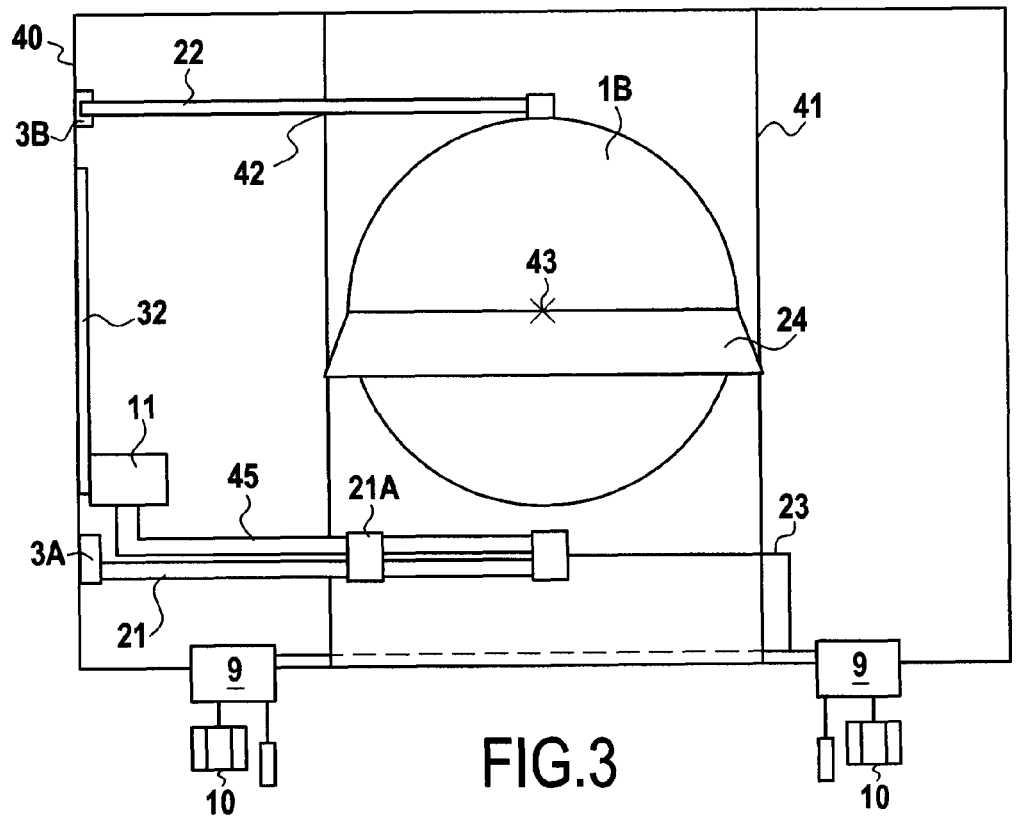
FIG. 3 is a diagrammatic elevation view showing a second example of a mounting for a liquid storage system of the invention on a spacecraft platform.

FIG. 3 shows a variant embodiment that is essentially similar to the embodiment of FIG. 2 but in which the cryorefrigerator 11 is offset towards the radiator 32. In this configuration, the link between the cryorefrigerator 11 and the tank is provided with the help of a heat pipe 45 that may be received in the same evacuated line as the filling/emptying line 21. This enables the line 21 to be coupled thermally with the heat pipe 45. The heat pipe 45 and the line 21 are inserted in the connection 21A in translation prior to the connection being closed.

Vacuum insulation of the filling line 21, e.g. with Johnston type connections, serves to avoid having heat bridges that might lead to local boiling (the boiling point of liquid xenon is −110° C.).

The evaporated fluid in contact with the walls of the tank (initially at ambient temperature), is recovered by the line 22. It may optionally be recycled by cooling in the filler carriage.

Since the tank 1A is contained inside an evacuated casing 1B, it can itself be evaporated prior to being filled. This serves to avoid contamination with air or other gas.

Filling is performed a few days before launch in preparation premises with the axis of the platform being vertical. The cryorefrigerator 11 serves to compensate heat losses. If it is not possible to power the refrigerator after the nose cone has been closed, the low levels of heat loss allow the system to be left unrefrigerated for more than two days prior to launch. Active refrigeration becomes possible once more once in space, as soon as the solar panels have been deployed.

For interplanetary missions, xenon needs to be kept in the liquid state for a minimum of several months. Under such conditions, passive insulation of the tank is not feasible in practice.

It is necessary both to diminish heat losses (super-insulation under a vacuum) and to cool the tank. The cryorefrigerators used for scientific missions enable refrigerating power of more than 10 watts (W) to be obtained at 100 kelvins (K). The tank 1A is kept cold by a refrigerator 11 of this type.

Figure 4:
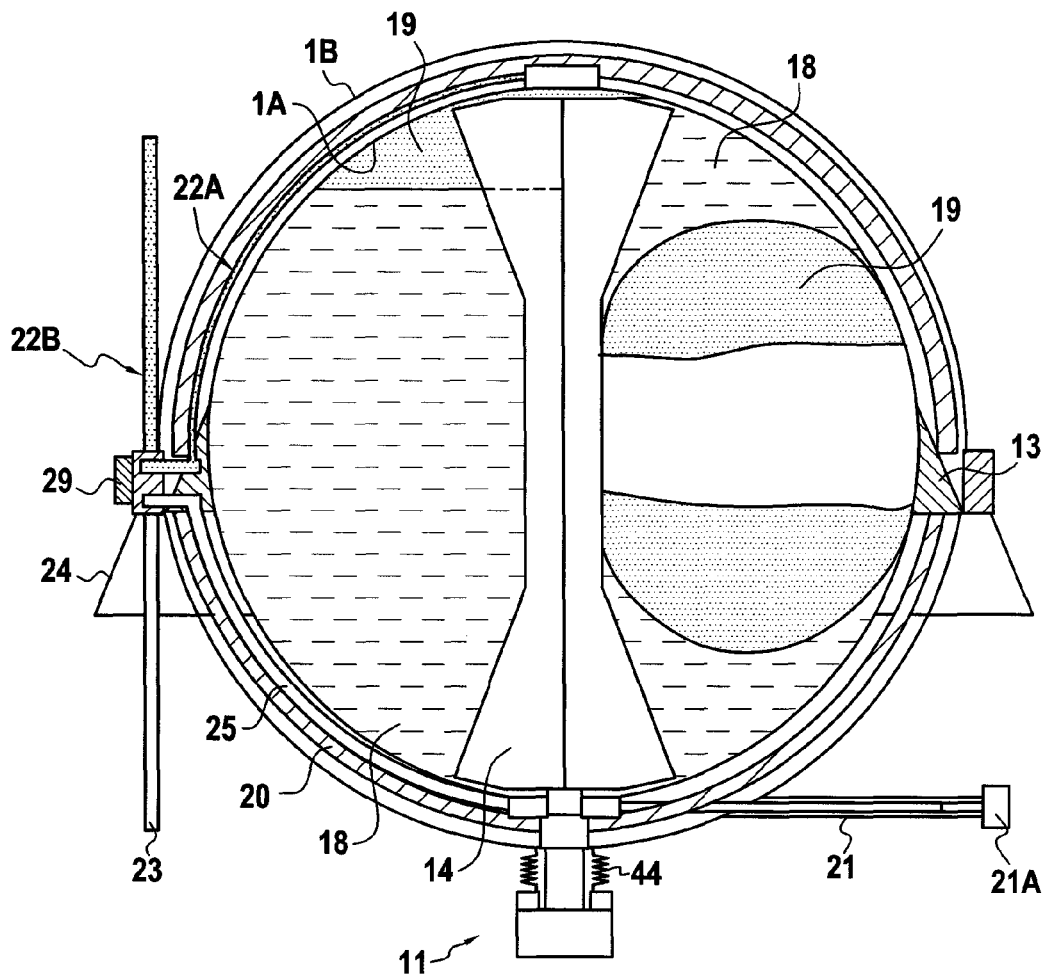
FIG. 4 is an axial section view of an example of a tank suitable for use in the liquid storage system of the invention, the left half of the figure corresponding to behavior on the ground, and the right half corresponding to behavior in microgravity.

The thermal insulation under a vacuum is constituted by a multilayer super-insulator 20 situated between the tank 1A and the outer casing 1B that enables the vacuum to be maintained (see FIG. 4).

The inner tank 1A is held inside the outer casing 1B either by links of composite material having low thermal conductivity, or by a skirt 13 made of the same material (FIG. 4).

The cryorefrigerator 11 is preferably situated close to the filling/emptying orifice, as shown in FIGS. 2, 4, 8, and 9. It may be offset to its radiator 32, thus making it possible to eliminate the cooling loop 31, as shown in FIG. 3.

Figure 6:
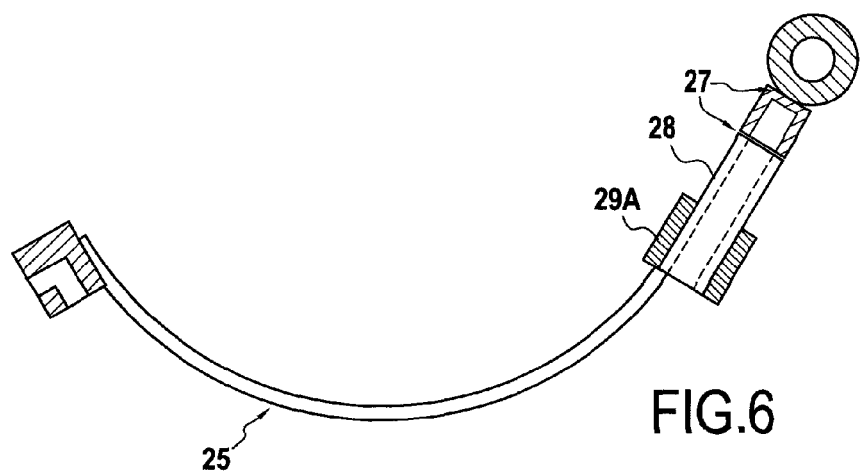
FIG. 6 is a detail view showing another example of a pipe with a separate evaporator suitable for use in combination with the tank of FIG. 4.

In microgravity, the xenon or other inert gas wets the walls of the tank 1A. Assuming that the tank is isothermal, the liquid wets all of its walls, at least at the beginning of a mission, so it is therefore not possible to extract gas from the top orifice. For this purpose, an evaporator 28 is used, which evaporator is constituted by porous material and is immersed at one end in the liquid (close to the cryorefrigerator 11, and thus at the coldest location). The evaporator is extended by a tube of small section that allows vapor to pass but that is subjected to a temperature gradient between the inner tank 1A (isothermal and cold) and the outer casing 1B (at ambient temperature). The other end of the evaporator may receive a heater element 29 that serves to vaporize liquid at a high rate. This heater element is out of circuit in the absence of any flow rate demand (see FIGS. 4 and 6).

Even if the evaporator 28 is immersed, it naturally forms a liquid/vapor interface in its capillary. If the thruster feed valves are open, the meniscus moves back into the evaporator 28, which then begins to operate again. A thermal mass on the outer wall ensures that any droplets of liquid xenon that have managed to remain there evaporate. When the valves are closed, the volume of vapor in the line prevents liquid from penetrating.

FIG. 4 is an axial section view showing how a tank is organized, the left half of the figure showing its behavior on the ground and the right half its behavior in microgravity.

The evacuated space between the inner tank 1A and the outer casing 1B contains a super-insulator 20, a portion of the feed line 21, an internal portion 22A of a vapor exhaust line, and the line 25 providing the connection between the inner tank 1A and the outer casing 1B, forming an evaporator.

The lines 22A and 25 are of length that is greater than or equal to the radius of the tank 1A, thereby providing good thermal decoupling, with heat losses by conduction being minimized. The vapor exhaust line is extended by an external line 22B.

FIG. 4 shows the distribution of the liquid 18 and the bubble of vapor 19 within the tank 1A.

As mentioned above with reference to FIG. 2, the tank 1A and its outer casing 1B need to be mounted close to the overall center of gravity 43 of the spacecraft.

In addition, it is preferable to limit variations in the center of gravity of the tank as a function of the quantity of liquefied inert gas that has been drawn off, in particular to simplify attitude control of the satellite or probe.

For this purpose, a propellant management device (PMD) is used that enables the liquid-vapor interface to be maintained in such a manner as to center the mass of liquefied inert gas on the geometrical center of the tank. Such a propellant management device may be made up of cross-shaped blades 14 (FIGS. 4, 7, and 8) or of conical skirts 15 (FIG. 9) placed inside the tank, which blades are of the kind already to be found in certain surface tension tanks.

Operating at liquid-vapor equilibrium implies that the PMD 14, 15 performs an additional function: it must cool the liquid so as to avoid bubbles of vapor forming at its surface, and it must be situated in the coldest portion of the tank. The heat flux passing through mechanical fastenings leads to a small amount of extra heating, thereby causing local drying of the wall when the tank is filled in part. It is therefore necessary to mount the PMD 14, 15 perpendicularly to the mechanical fastenings whenever that is possible. This leads to two types of solution.

Figure 7:
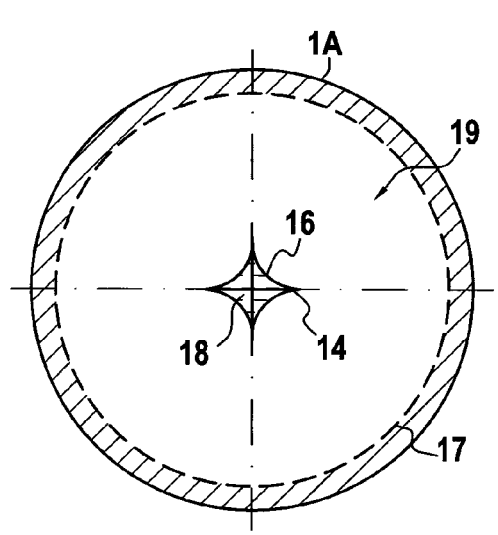
FIGS. 7 and 8 are diagrammatic views respectively in equatorial section and in meridian section showing an example of an equatorially-fastened tank suitable for use with the liquid storage system of the invention.
Figure 8:
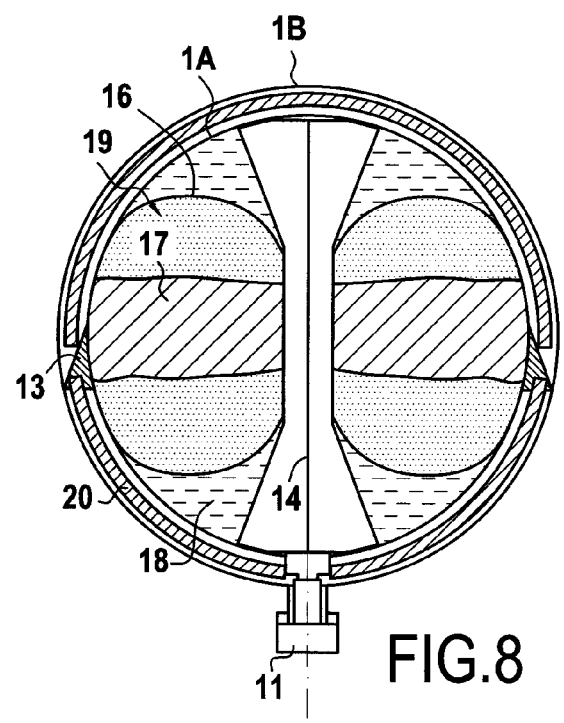

FIGS. 7 and 8 are equatorial and meridian sections showing the equilibrium shape in microgravity taken up by the xenon in a tank 1A with equatorial fastening 13. The hottest part of the tank 1A is situated at its equator, and thus the portion of said wall 17 is in direct contact with vapor and is dry. A PMD 14 of cross-shape is placed on the polar axis. Compared with known PMDs, this PMD performs another function: it cools the liquid in contact with the fins. This can be achieved by using an alloy that is a good conductor of heat (aluminum or copper) possibly associated with a heat pipe (possibly using the same fluid as the liquid for storage). The PMD is cooled by a cryorefrigerator H that may be of the Stirling, Joule Thomson, or pulsed gas tube type.

Equatorial fastening is performed with the help of a frustoconical skirt 13 made of insulating material.

The liquid takeoff is situated close to the cryorefrigerator on the polar axis. The free surface of the liquid in microgravity is toroidal in shape and it is identified by reference 16 (FIG. 8).

Figure 9:
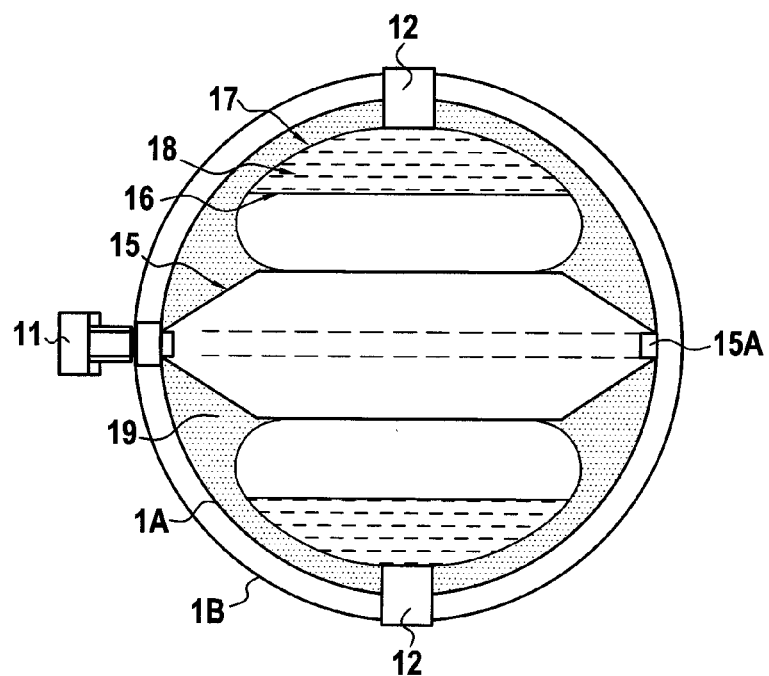
FIG. 9 is a diagrammatic meridian section of an example of a polar-fastened tank suitable for use with the liquid storage system of the invention.

FIG. 9 is a meridian section of another embodiment that uses polar fastening 12. The poles are thus hotter than the remainder of the tank. Two conical skirts 15 cooled by an equatorial ring 25, itself cooled by the cryorefrigerator 11, perform the PMD function by imposing a free surface 16 that is a surface of revolution, thereby maintaining the center of gravity of the liquid close to the center of the tank 1A.

A polar fastening 12 is well suited to tanks that include a cylindrical section.

The tank 1A and its outer casing 1B are subjected to vibration from the spacecraft, such as a launcher. The elastic response of the fastening (whether polar or equatorial) induces relative movement between the outer casing 1B and the inner tank 1A. Since the head of the cryorefrigerator 11 needs to be mounted hermetically on the outer casing 1B, this can result in excessive forces acting on the cold head secured to the inner tank 1A. To remedy this problem, it is possible to implement a decoupling bellows 44 between the cryorefrigerator 11 and the outer casing 1B, with the cold head of the cryorefrigerator 11 being secured to the tank 1A. The decoupling bellows 44 allows the cryorefrigerator 11 to move relative to the outer casing 1B during thermal cycling and also in the presence of vibration (FIG. 4).

In the embodiment of FIGS. 4 and 8, the cryorefrigerator 11 cools the PMD 14 by conduction, thereby condensing vapor thereon, and thus causing it to be wetted by the liquid. The hotter portion of the wall of the tank 1A is situated at the equator, with the heat flux being conducted by the mechanical connection 13. This leads to the wall portion 17 being dried progressively as a function of the amount of the liquid that has been consumed.

Figure 5:
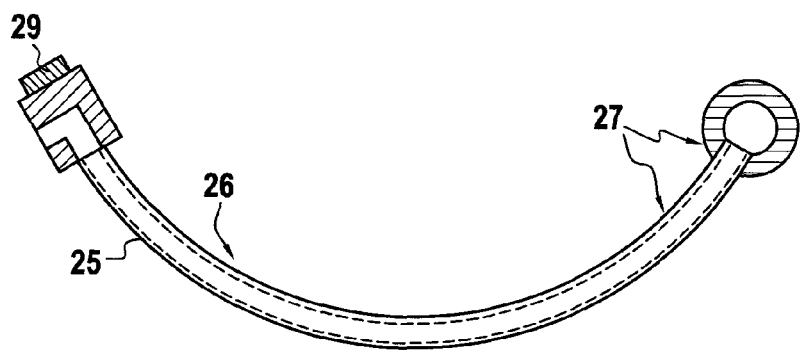
FIG. 5 is a detail view showing an example of a pipe also acting as an evaporator suitable for use in combination with the tank of FIG. 4.

FIG. 5 shows an embodiment in which the pipe 25 also acts as an evaporator. An internal grid 26 retains the liquid that evaporates progressively in the zone 27. The equatorial flange of the outer casing 1B may be heated by a resistance element 29 to ensure that vaporization in the event of the flow rate being high. To simplify FIG. 5, the flange is shown at 90° relative to its real position.

The internal grid 26 may be a metal fabric placed in the line 25, allowing liquid to pass at the periphery of the line but not at its center, in a configuration analogous to a heat pipe. The evaporator function is then performed by the line 25 as a whole, whereas in the embodiment of FIG. 6, the evaporator is shorter and the heater element 29 is situated in a vacuum at the axial end of the evaporator rather than on the equatorial flange.

What is claimed is:

1. A cryogenic liquid storage system for a spacecraft, the system comprising:
    at least one liquid tank having a diameter;
    an outermost spherical casing surrounding the tank;
    an evacuated space provided between the tank and the outermost casing;
    a propellant management device made of material that is a good conductor of heat and that is cooled by a cryorefrigerator to localize the liquid inside the tank when in microgravity;
    a filler pipe situated in the portion of the tank that is at the bottom when the tank is on the ground, and that is surrounded by an evacuated insulating double wall; and
    a purge pipe connecting the tank to the outermost casing and presenting an internal length that is not less than half the diameter of the tank; and
    means for holding the tank inside the outermost casing, the holding means being directly in contact with both the outermost casing and the tank and presenting a low thermal conductivity and being spaced apart angularly by 30° to 120° relative to the propellant management device that is cooled by the cryorefrigerator, wherein said system includes super-insulating material interposed between the tank and the outermost casing, wherein said holding means comprise a fastener frusto-conical skirt of insulating material interposed in the vicinity of an equatorial plane between the tank and the outermost casing, wherein said system includes an evaporator immersed in the liquid of the tank at the location closest to the cryorefrigerator, which the evaporator comprises a porous material and is extended by a tube of small section that is connected to the outermost casing; and wherein a heater element is associated with the evaporator and is located at an outlet of the tube of small section and at the skirt or outermost spherical casing.

2. The system according to claim 1, wherein the propellant management device is disposed on a polar axis of the tank.

3. The system according to claim 1, wherein the liquid tank and the outermost casing are mounted in a central tube in the vicinity of the center of gravity of the spacecraft.

4. The system according to claim 1, including a decoupling bellows interposed between the cryorefrigerator and the outermost casing.

5. The system according to claim 1, including a cryorefrigerator having a cold head incorporated in the tank in the vicinity of a liquid takeoff opening, the cryorefrigerator being connected to a radiator by a cooling loop.

6. The system according to claim 5, wherein the cryorefrigerator is of the Stirling type.

7. The system according to claim 5, wherein the cryorefrigerator is of the pulsed gas tube type.

8. The system according to claim 1, including a cryorefrigerator mounted directly on a radiator and connected to the tank by a cryogenic heat pipe.

9. The system according to claim 8, wherein the cryorefrigerator is of the Stirling type.

10. The system according to claim 8, wherein the cryorefrigerator is of the pulsed gas tube type.

11. The system according to claim 1, including a cryorefrigerator of the Joule Thomson type.

12. The system according to claim 1, wherein the cryogenic liquid stored in the tank is a liquefied inert gas comprising xenon, krypton, neon, or argon for feeding gridded plasma or ion electric thrusters.

13. The system according to claim 1, wherein the cryogenic liquid stored in the tank is liquid oxygen.

14. The system according to claim 1, wherein the spacecraft is constituted by a satellite, an automatic probe, an inhabited spacecraft.

15. The system according to claim 1, further comprising a pressure sensor for monitoring the vapor pressure inside the tank.

* * * * *